(12) United States Patent
Couture et al.

(10) Patent No.: US 6,355,178 B1
(45) Date of Patent: Mar. 12, 2002

(54) CYCLONIC SEPARATOR WITH ELECTRICAL OR MAGNETIC SEPARATION ENHANCEMENT

(76) Inventors: Theodore Couture, P.O. Box 1474, Main Post Office, Edmonton (CA), T5J 2N5; Norman Arrison, 11412-102 Avenue, Edmonton (CA), T5K 0P9

( * ) Notice: Subject to any disclaimer, the term of this patent is extended or adjusted under 35 U.S.C. 154(b) by 0 days.

(21) Appl. No.: 09/539,704

(22) Filed: Mar. 31, 2000

Related U.S. Application Data

(60) Provisional application No. 60/127,482, filed on Apr. 2, 1999.

(51) Int. Cl.[7] .......................... B01D 45/16; B04C 9/00; B03C 1/00; B03C 5/02
(52) U.S. Cl. .................. 210/748; 210/787; 210/223; 210/243; 210/512.1; 210/695; 95/63; 96/2; 96/3; 96/61; 96/75
(58) Field of Search ................. 210/695, 748, 210/787–788, 222, 223, 243, 512.1; 95/57, 63, 70, 78, 271; 96/1–3, 54, 55, 57, 61, 75, 208, 209

(56) References Cited

U.S. PATENT DOCUMENTS 1,130,212 A * 3/1915 Steere
1,358,031 A * 11/1920 Smith (List continued on next page.)

*Primary Examiner*—David A. Simmons
*Assistant Examiner*—Fred Prince
(74) *Attorney, Agent, or Firm*—Bennett Jones LLP

(57) ABSTRACT

A cyclone or hydrocyclone for separating fluids and particles includes an electrostatic charge generator, a direct current power source, a magnet or an electromagnet for augmenting the centrifugal separation forces generated by the cyclone or hydrocyclone. The cyclone or hydrocyclone also includes a physical vibration generator or a sonic wave generator or both.

8 Claims, 14 Drawing Sheets

U.S. PATENT DOCUMENTS

| | | | |
|---|---|---|---|
| 1,358,032 A | * | 11/1920 | Smith |
| 1,778,910 A | * | 10/1930 | Niven |
| 2,874,839 A | * | 2/1959 | Rogers, Jr. |
| 3,528,552 A | * | 9/1970 | Martin |
| 3,875,061 A | | 4/1975 | Palma |
| 3,890,103 A | | 6/1975 | Konishi |
| 3,917,479 A | * | 11/1975 | Sayce et al. |
| 3,945,613 A | | 3/1976 | Jysky et al. |
| 3,969,224 A | | 7/1976 | Cerbo |
| 4,017,385 A | | 4/1977 | Morton et al. |
| 4,066,526 A | * | 1/1978 | Yeh |
| 4,090,855 A | | 5/1978 | Hora et al. |
| 4,120,769 A | | 10/1978 | Prestridge |
| 4,140,628 A | | 2/1979 | Horsfail |
| 4,144,164 A | | 3/1979 | Absil et al. |
| 4,154,972 A | | 5/1979 | Tylko |
| 4,166,788 A | | 9/1979 | Druz et al. |
| 4,239,513 A | | 12/1980 | Paul et al. |
| 4,285,701 A | | 8/1981 | Schlenker |
| 4,343,707 A | | 8/1982 | Lucas |
| 4,352,681 A | | 10/1982 | Dietz |
| 4,398,928 A | | 8/1983 | Kunsagi |
| 4,432,849 A | | 2/1984 | Saito |
| 4,458,148 A | | 7/1984 | Hirschfield et al. |
| 4,462,907 A | | 7/1984 | Waldecker |
| 4,588,423 A | | 5/1986 | Gillingham et al. |
| 4,594,149 A | | 6/1986 | Andres et al. |
| 4,635,161 A | | 1/1987 | Le Vantine |
| 4,657,567 A | | 4/1987 | Callgrern et al. |
| 4,668,381 A | | 5/1987 | Julius |
| 4,689,951 A | * | 9/1987 | Polach |
| 4,715,934 A | | 12/1987 | Tamminen |
| 4,718,923 A | | 1/1988 | Haag et al. |
| 4,726,904 A | | 2/1988 | Avers |
| 4,772,381 A | | 9/1988 | Julius |
| 4,852,349 A | | 8/1989 | Abthoff et al. |
| 4,900,421 A | | 2/1990 | Grutzner et al. |
| 4,911,556 A | | 3/1990 | Lim et al. |
| 4,961,841 A | | 10/1990 | Andres et al. |
| 5,224,604 A | | 7/1993 | Duczmal et al. |
| 5,277,368 A | | 1/1994 | Kindig |
| 5,316,746 A | | 5/1994 | Narita et al. |
| 5,334,364 A | | 8/1994 | Aquirre-Villafana et al. |
| 5,352,343 A | | 10/1994 | Balles et al. |
| 5,356,015 A | | 10/1994 | Notebaart et al. |
| 5,391,018 A | | 2/1995 | Parker |
| 5,565,078 A | | 10/1996 | Sams et al. |
| 5,565,105 A | | 10/1996 | Thakor |
| 5,573,954 A | | 11/1996 | Greene et al. |
| 5,575,896 A | | 11/1996 | Sams et al. |
| 5,591,253 A | | 1/1997 | Altman et al. |
| 5,593,378 A | | 1/1997 | Dyck |
| 5,643,469 A | | 7/1997 | Prevost et al. |
| 5,647,981 A | | 7/1997 | Prevost et al. |
| 5,683,494 A | | 11/1997 | Altman et al. |
| 6,036,027 A | * | 3/2000 | Grimes |

* cited by examiner

Prior Art

*Prior Art*

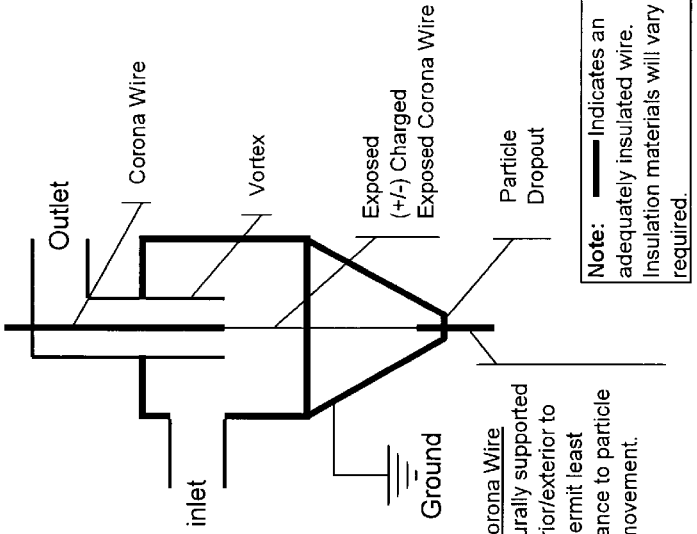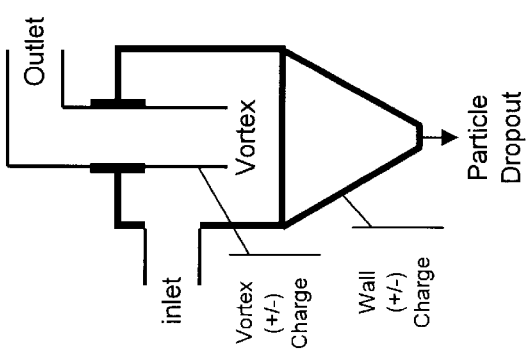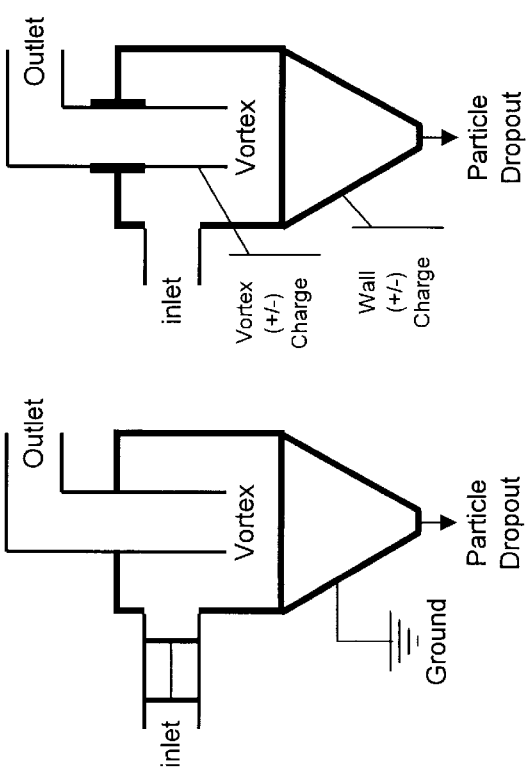

Vibrating Electromagnet Hydro/Gas Cyclone

Vibrating Sonic Hydro/Gas Cyclone

CYCLONIC SEPARATOR WITH ELECTRICAL OR MAGNETIC SEPARATION ENHANCEMENT

This application claims the priority benefit of U.S. Provisional Application No. 60/127,482 filed on Apr. 2, 1999 as ETY and entitled Apparatus and Process for Separating Fluids and Particles.

FIELD OF THE INVENTION

The present invention relates to a cyclone or hydrocyclone for separating small particles from fluids.

BACKGROUND OF THE INVENTION

Cyclones and hydrocyclones for the separation of suspended particles in fluids are well known. Scientifically, gases and liquids are both considered to be fluids. In this specification, the term "hydrocyclones" shall apply to devices which separate based on liquid-density differences and the "cyclones" shall apply to devices which are used to separate particles from a gas.

Gases do not always behave in the same manner as liquids. Gases increase in viscosity as the temperature rises whereas liquid viscosity decreases. An example is when ash and other particles mixed in combustion gases emitted by a furnace incinerator are compared to air and sawdust exhausted from a wood manufacturer.

Cyclones and hydrocyclones have become increasingly common in the industrial world through their relatively low cost to manufacture and their ability to separate various phases from one another in phase mixtures such as liquid-solid, liquid-liquid, gas-liquid and gas-solid.

FIGS. 1 and 2 schematically shows the geometry of a typical prior art cyclone and hydrocyclone. All cyclones or hydrocyclones comprise an offset inlet (1) which causes the fluid to enter the cyclone tangentially with a swirling flow, a conical body (2), a vortex finder (3) where fluid overflow escapes and a solids outlet (4) at the bottom of the cyclone. Of course, exact configurations will vary between different manufacturers. These differences are related to entrance geometry, body shape, angle of cone, vortex finder, and the means by which fluid is taken to or from the cyclone or hydrocyclone. Over the years there have been many designs of cyclones and hydrocyclones. The prime difference in the different designs are related to mechanical layout and their resulting performance.

Conventional cyclones and hydrocyclones are able to separate particles from fluids down to a particle size of about 1 to 2 microns. FIG. No. 3 graphically shows the performance of various sized prior art hydrocyclones. Generally, separation ability increases with the differential pressure and inversely with chamber size. However, there is a lower limit of particle size which may be separated with a conventional cyclonic separator.

SUMMARY OF THE INVENTION

The present invention includes both cyclones and hydrocyclones and for convenience, the term cyclone shall hereinafter refer to both.

The present invention was developed when it was noted that submicronic clay particles naturally possess a small negative electrical charge. Because it is accepted that opposite electrical charges are attracted to one another, it was postulated that these electrically charged particles could be separated more easily from its host fluid (liquid or gas) medium at micron and sub-micron levels by augmenting the centrifugal separation forces in a cyclone with exposure to an opposite electrical charge within the cyclone.

The present invention presents an advance over the prior art in that electrical coulomb forces, electrical currents, and/or magnetic forces are combined with centrifugal forces to give an improved separating ability over conventional cyclones. Three embodiments of the present invention were developed: one utilizing coulomb or electrostatic forces; a second utilizing direct current; and a third utilizing magnetic fields. In all three embodiments, means are provided to physically and/or sonically vibrate the cyclone wall and fluid.

The efficiency of the cyclone is improved with the addition of either a coulomb charge or a direct current applied to the cyclone apparatus. In the case of particles affected by magnetic force, the application of a magnetic field will improve the performance of the apparatus. When magnetic forces were used, the importance of mechanical vibrations is especially pronounced in assisting the particles in being discharged with the under-flow.

The particles may be precharged prior to entering the separation chamber of the cyclone. The higher the voltage of the precharger, without shorting the electrical system out, the better the separation. Introducing electromagnetic fields with varied frequencies and amplitude strengths with vibrations also improved separation results.

BRIEF DESCRIPTION OF THE DRAWINGS:

FIG. No. 1 is a diagram of a typical prior art hydrocyclone used to separate particles from liquids.

FIG. No. 2 is a diagram of a typical prior art cyclone used to separate solid particles from gases.

Figure 1:
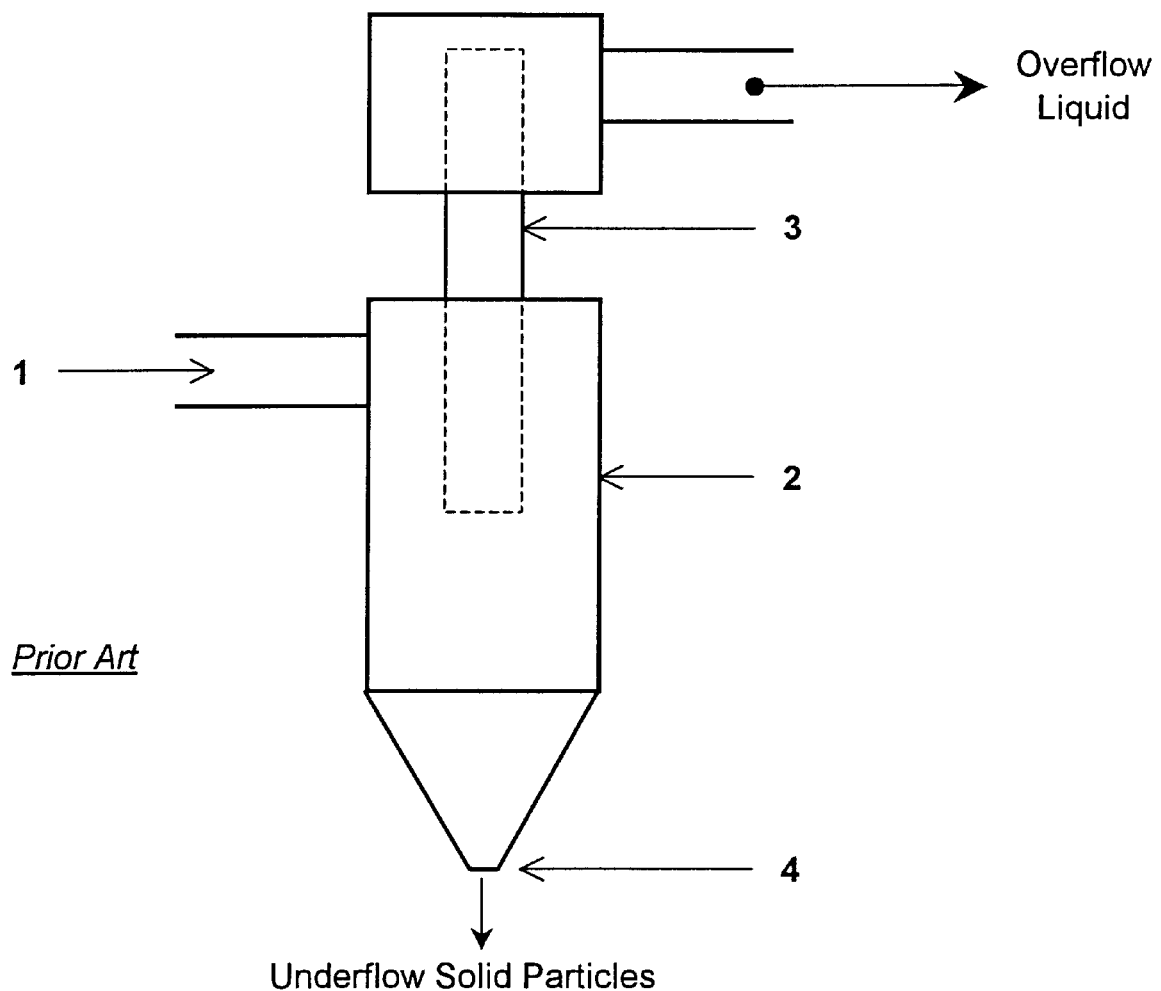
Figure 2:
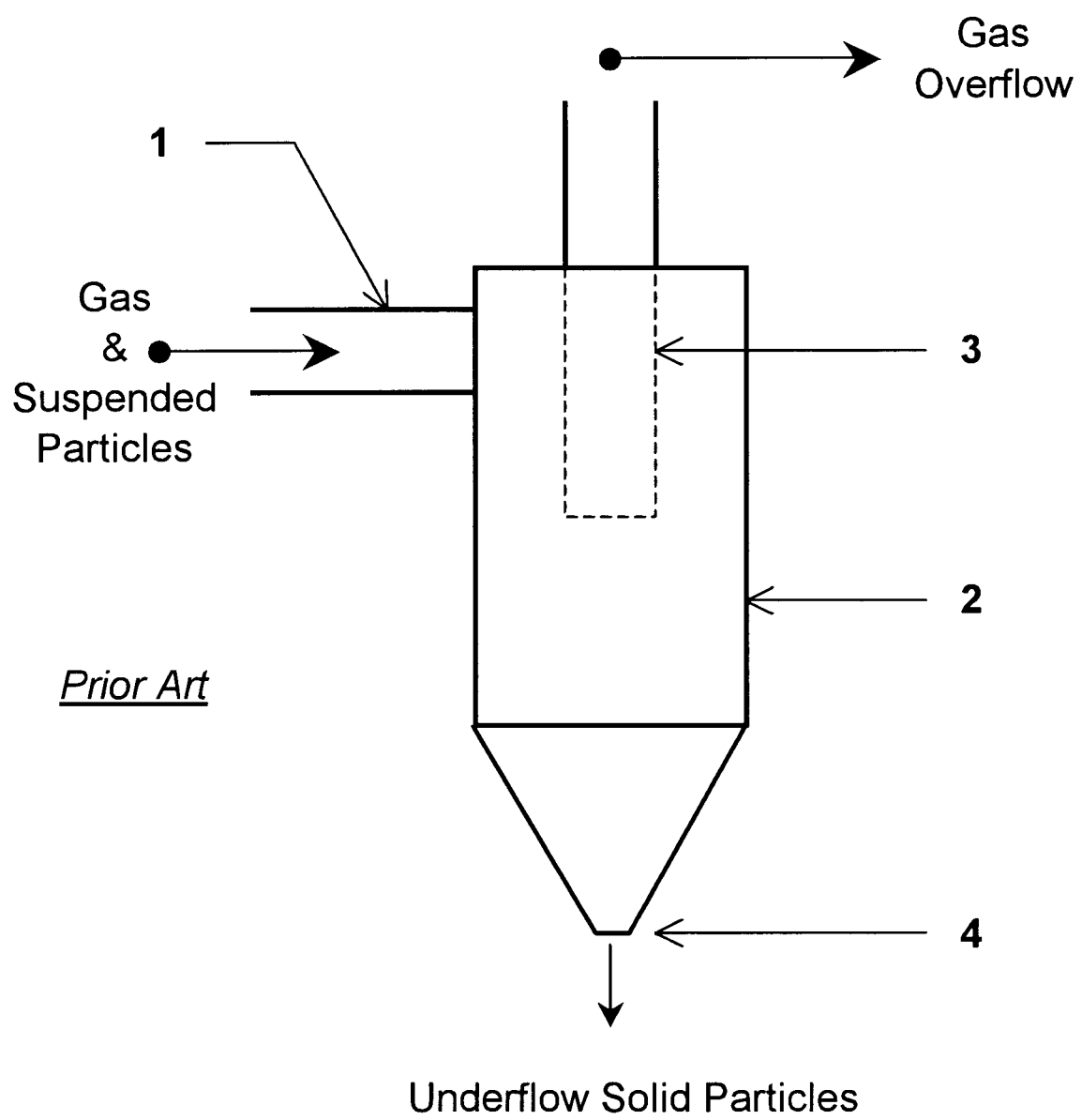
Figure 3:
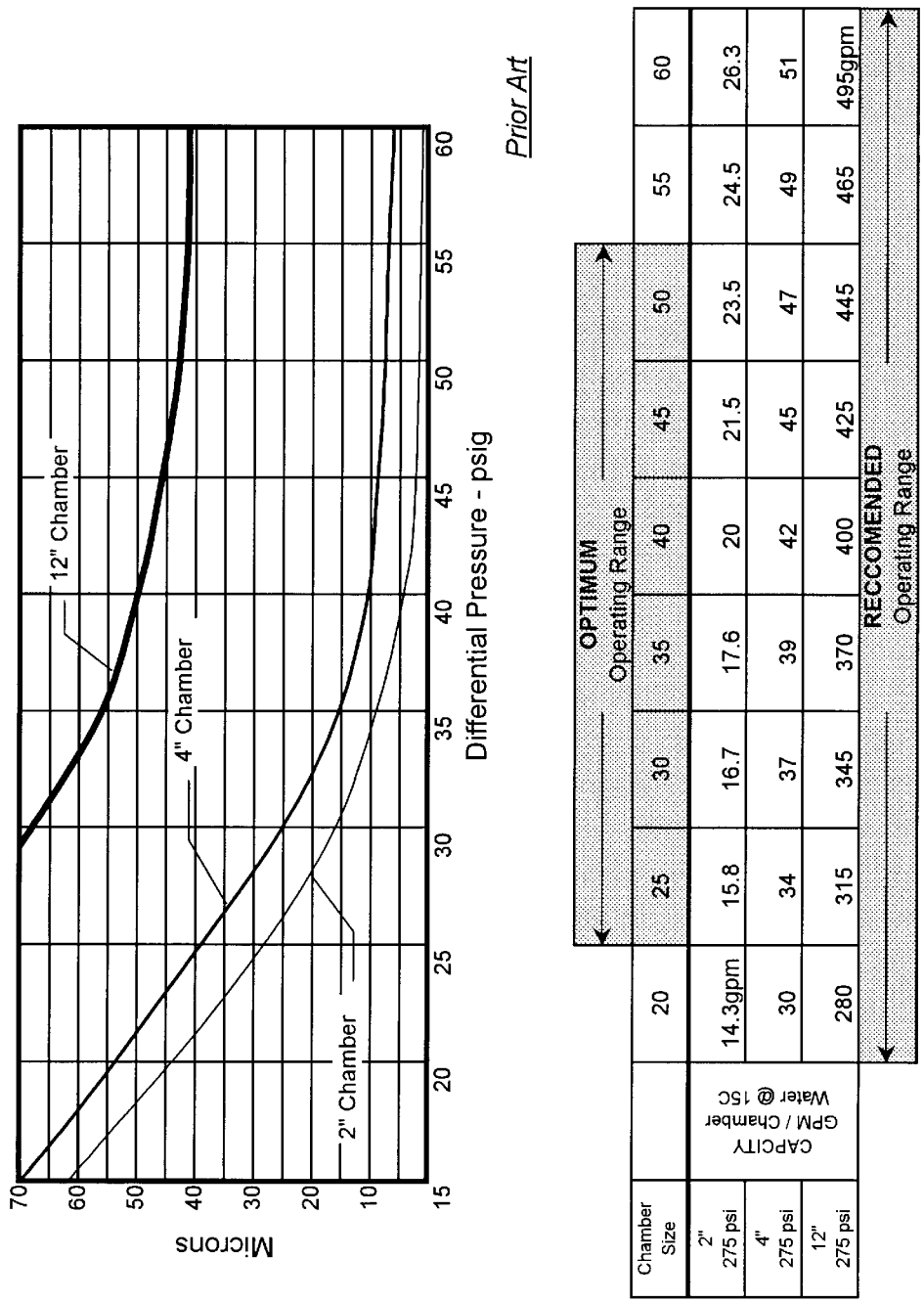
Figure 4:
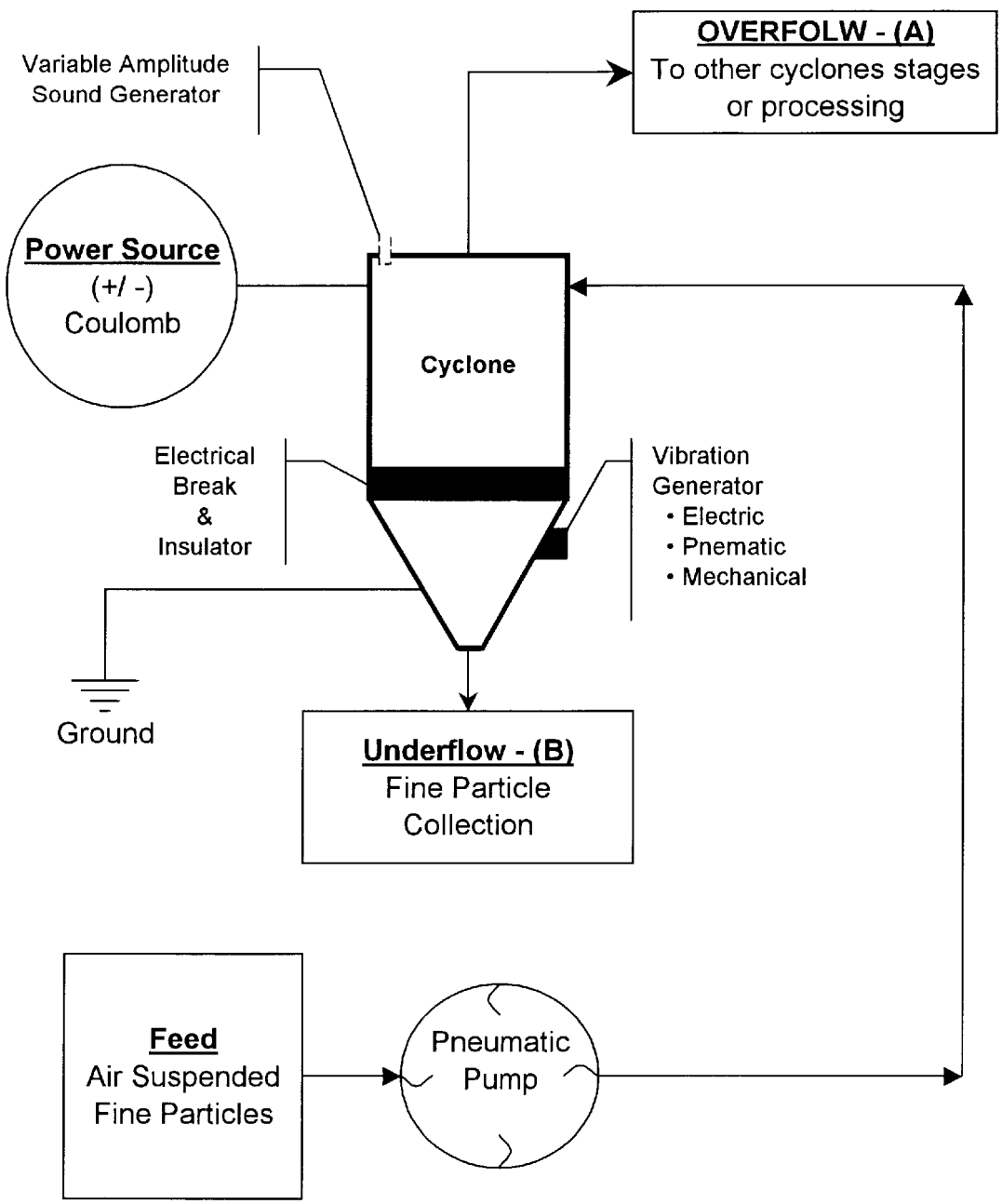
Figure 5:
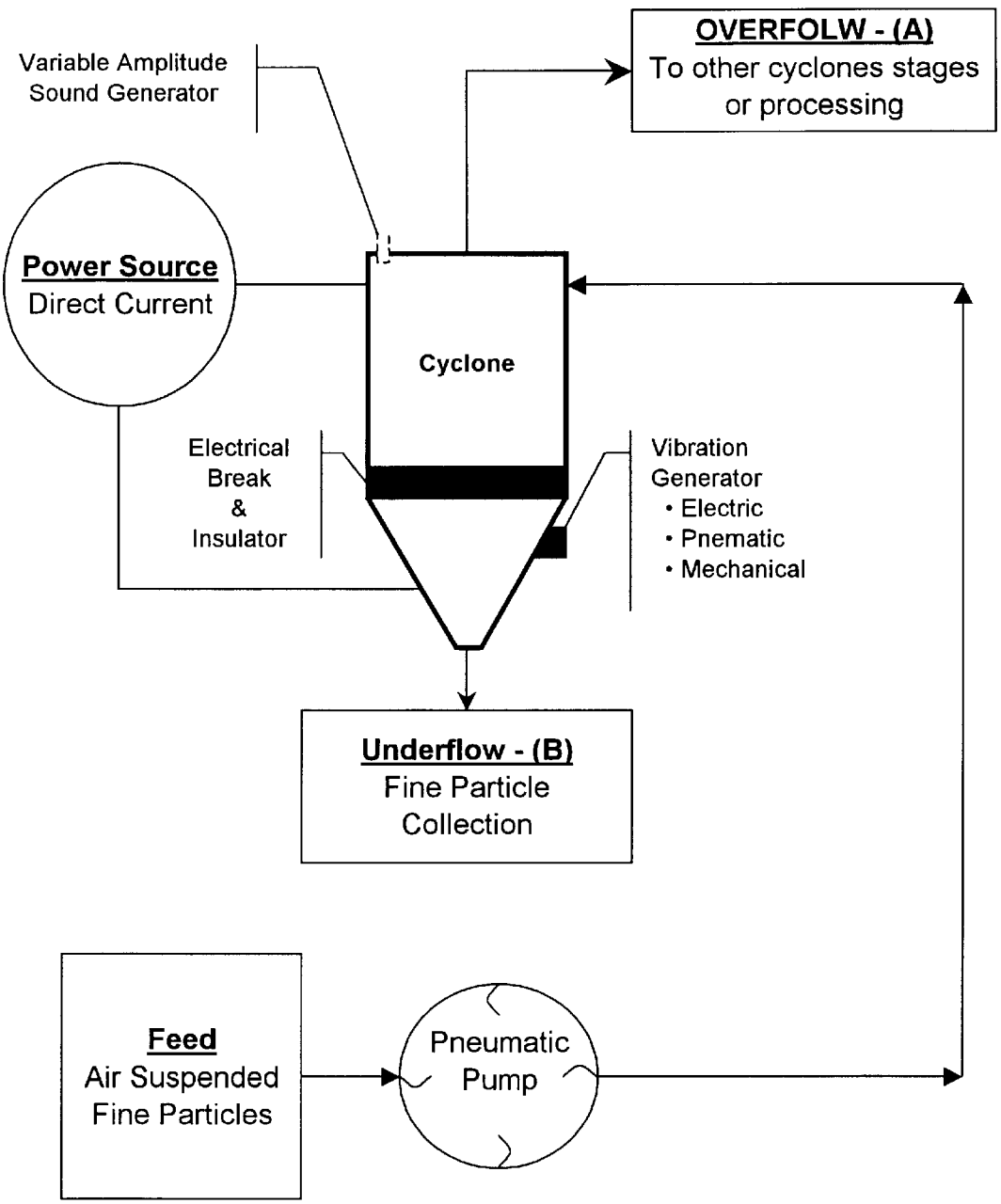
Figure 6:
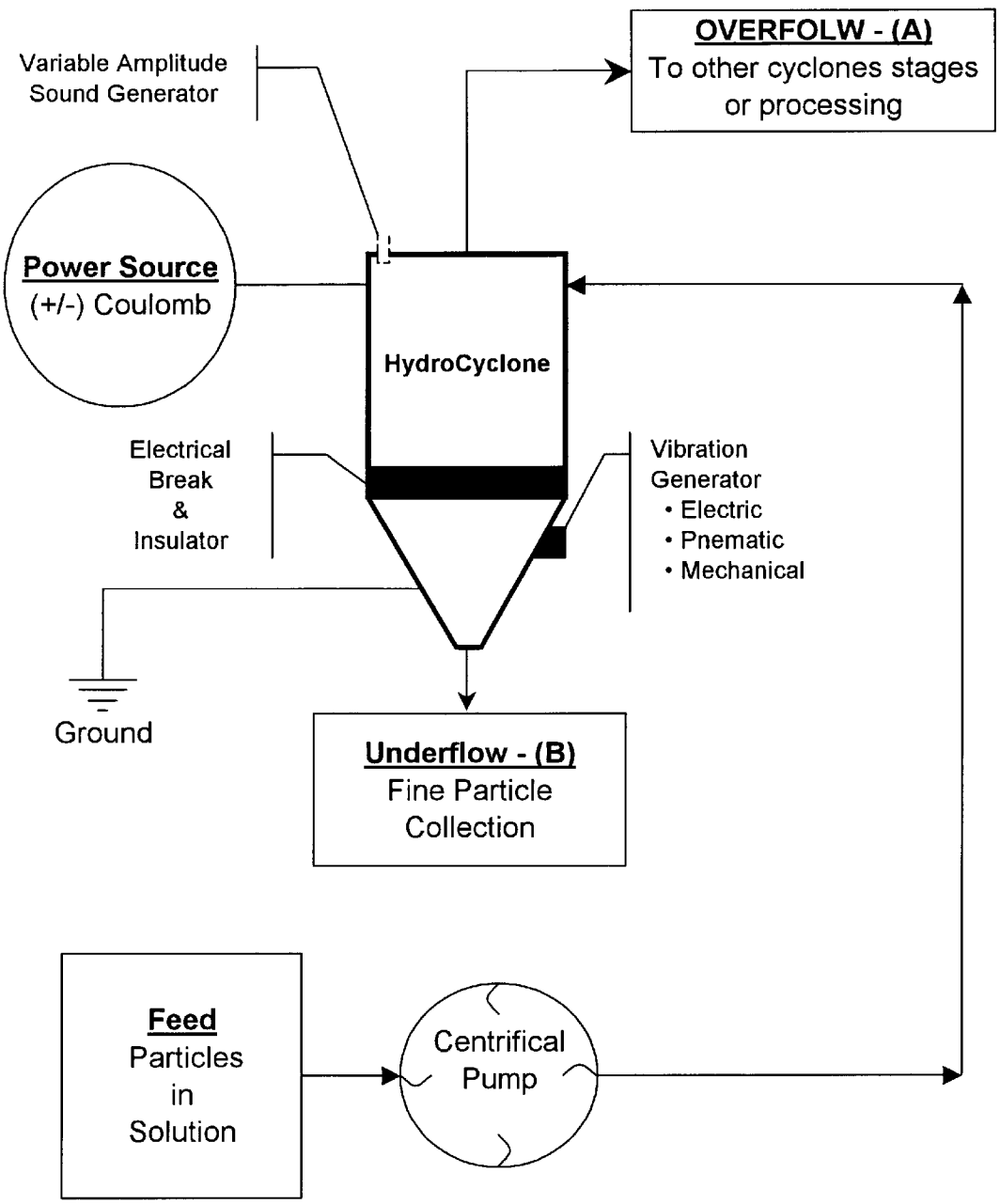
Figure 7:
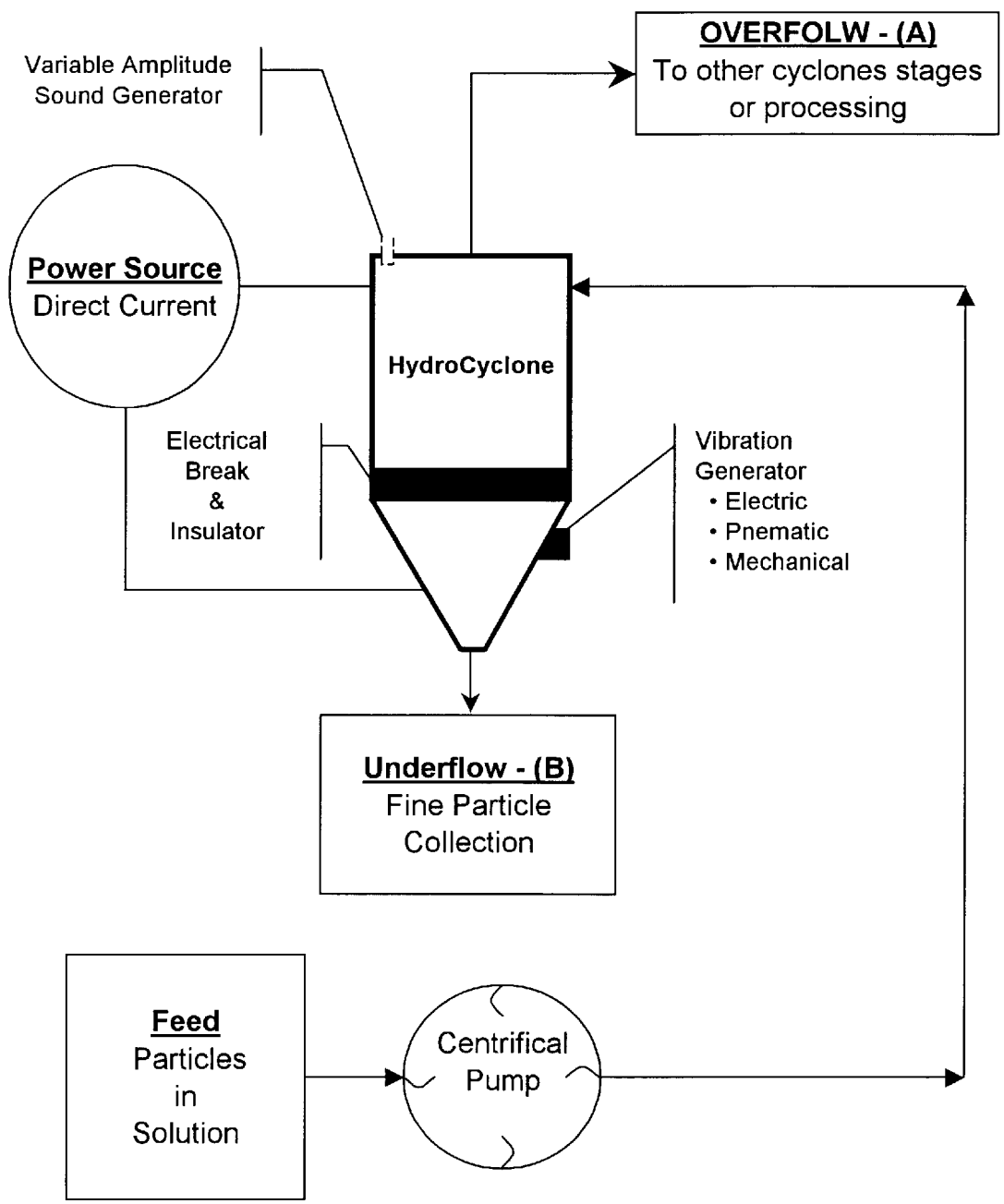
Figure 8:
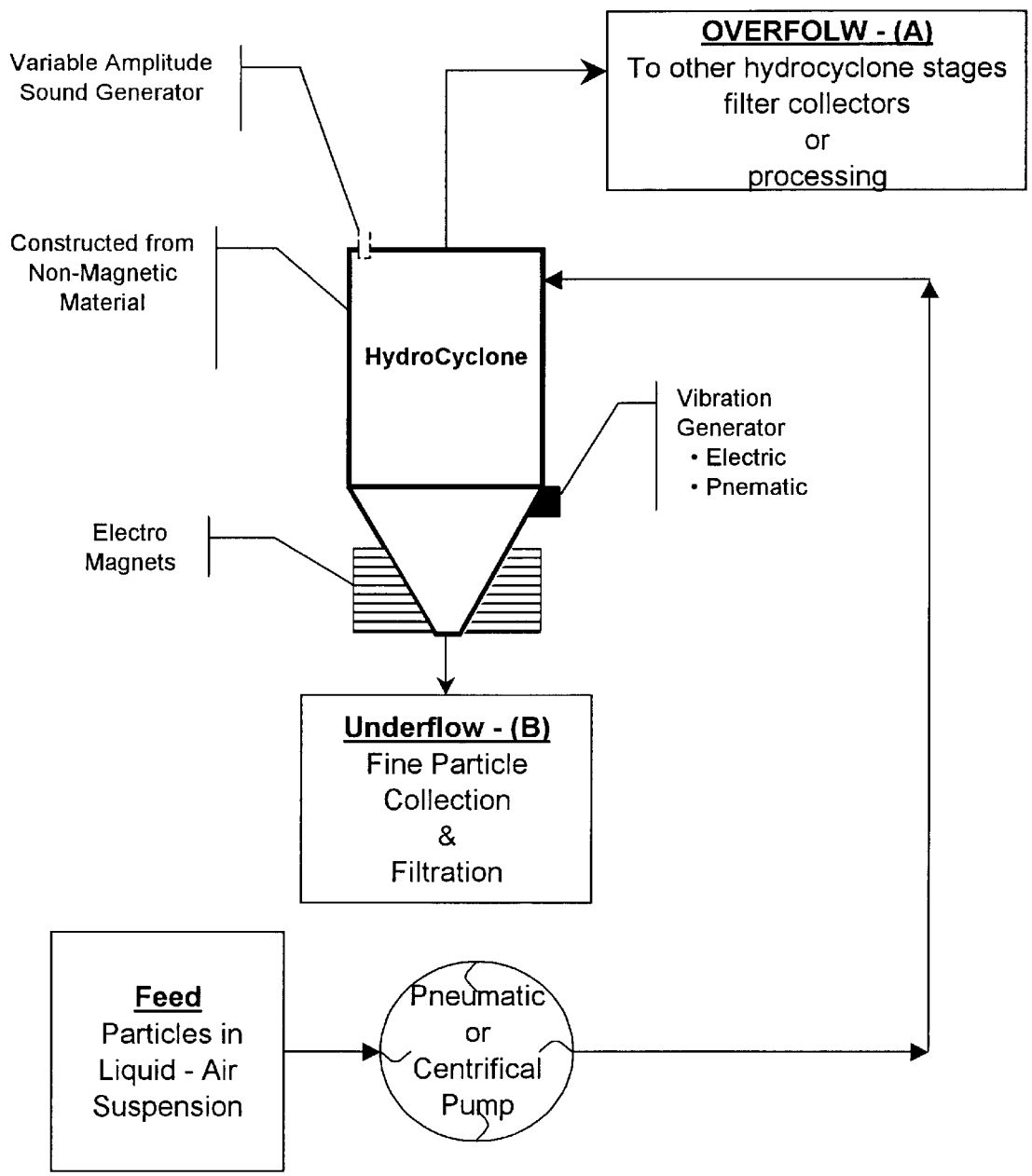
Figure 9:
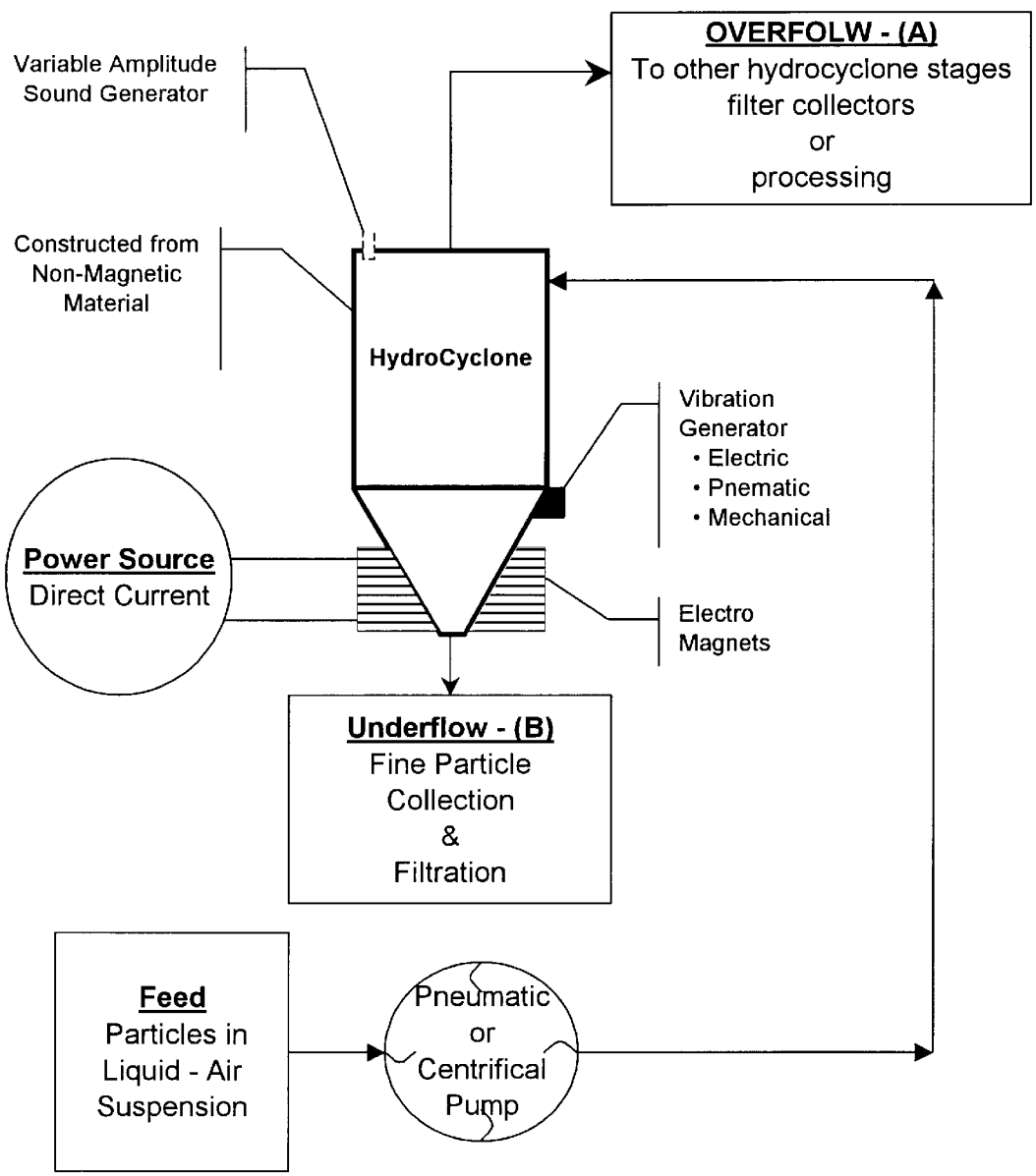
Figure 10:
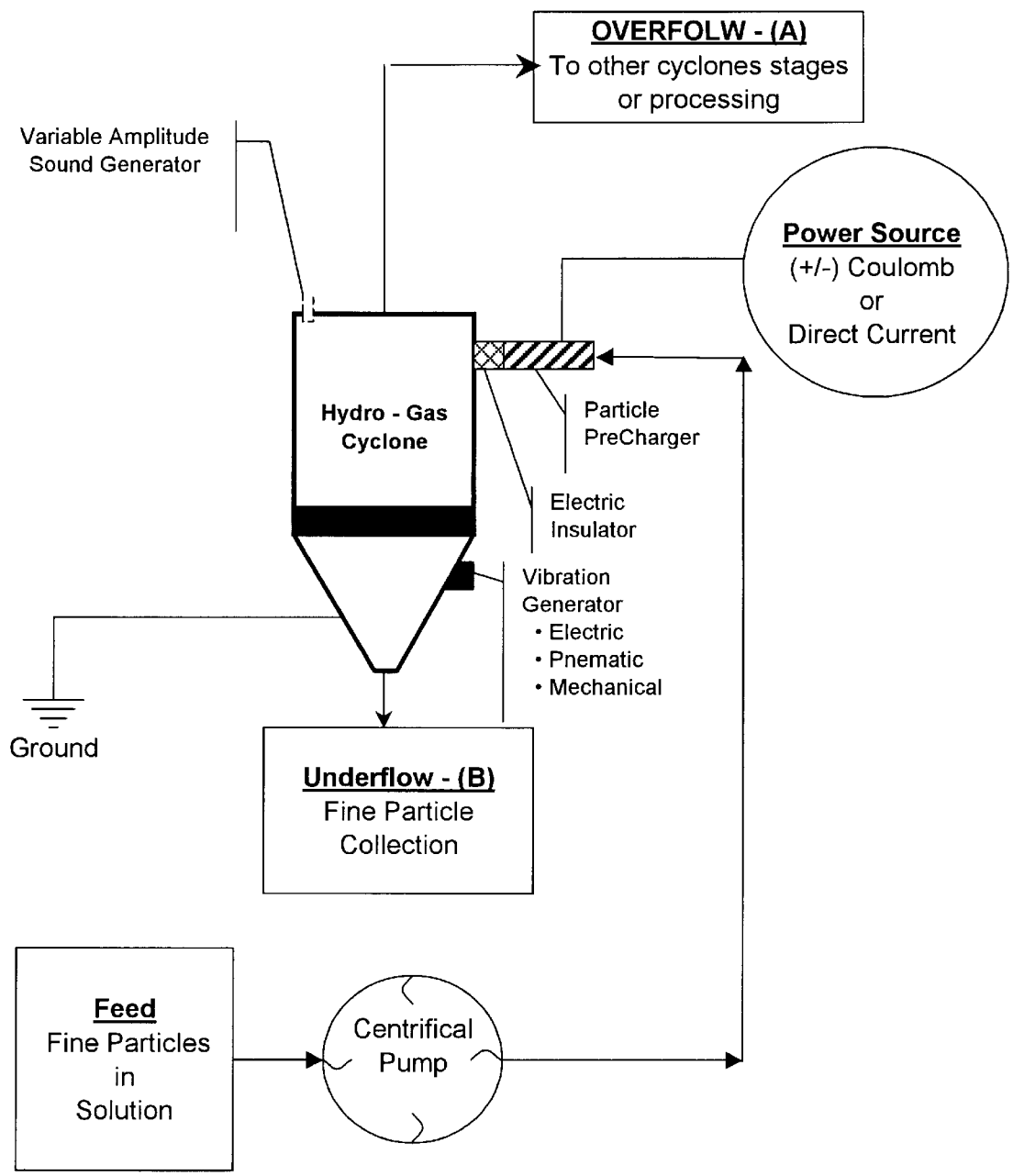
Figure 11:
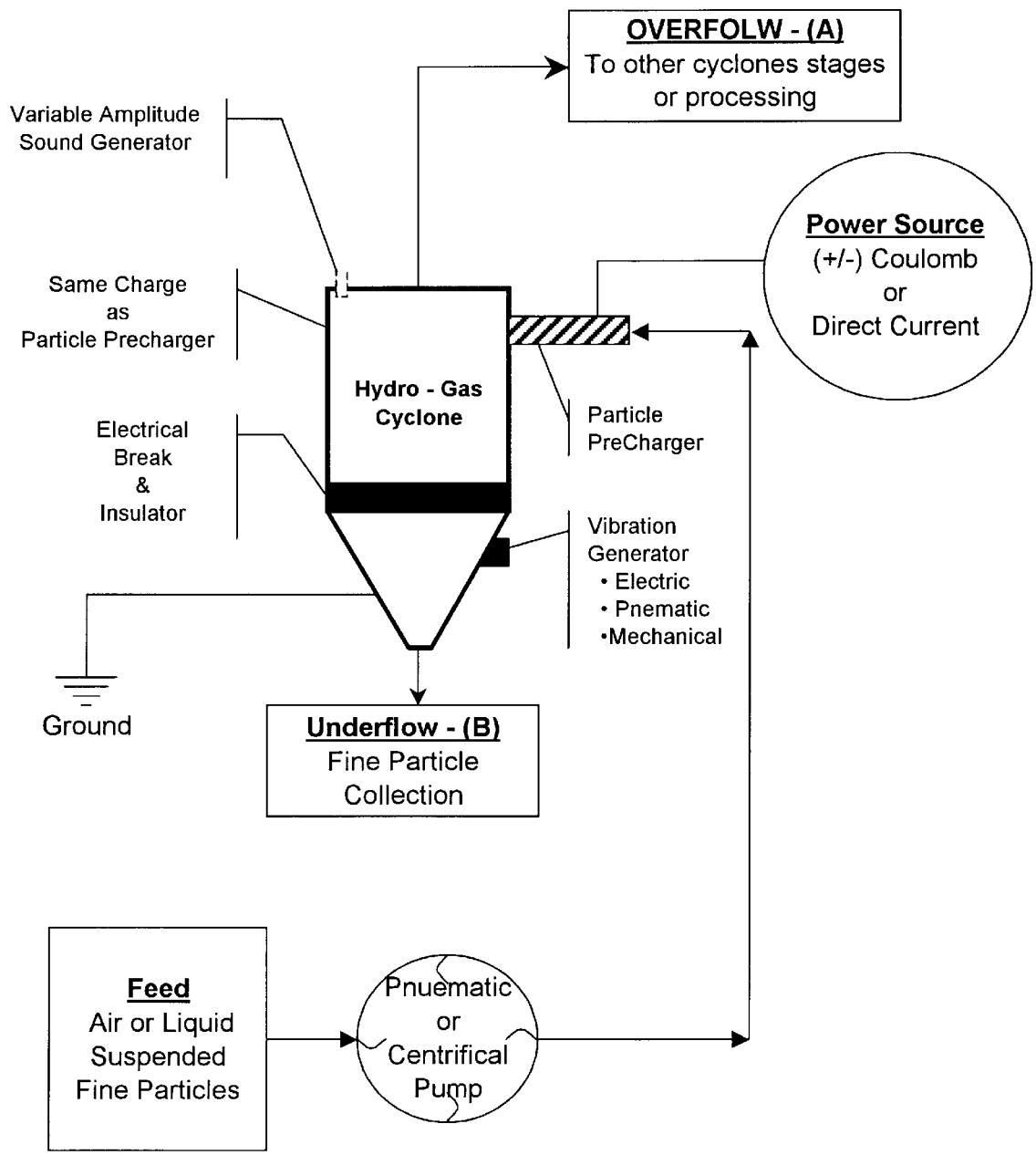
Figure 15:
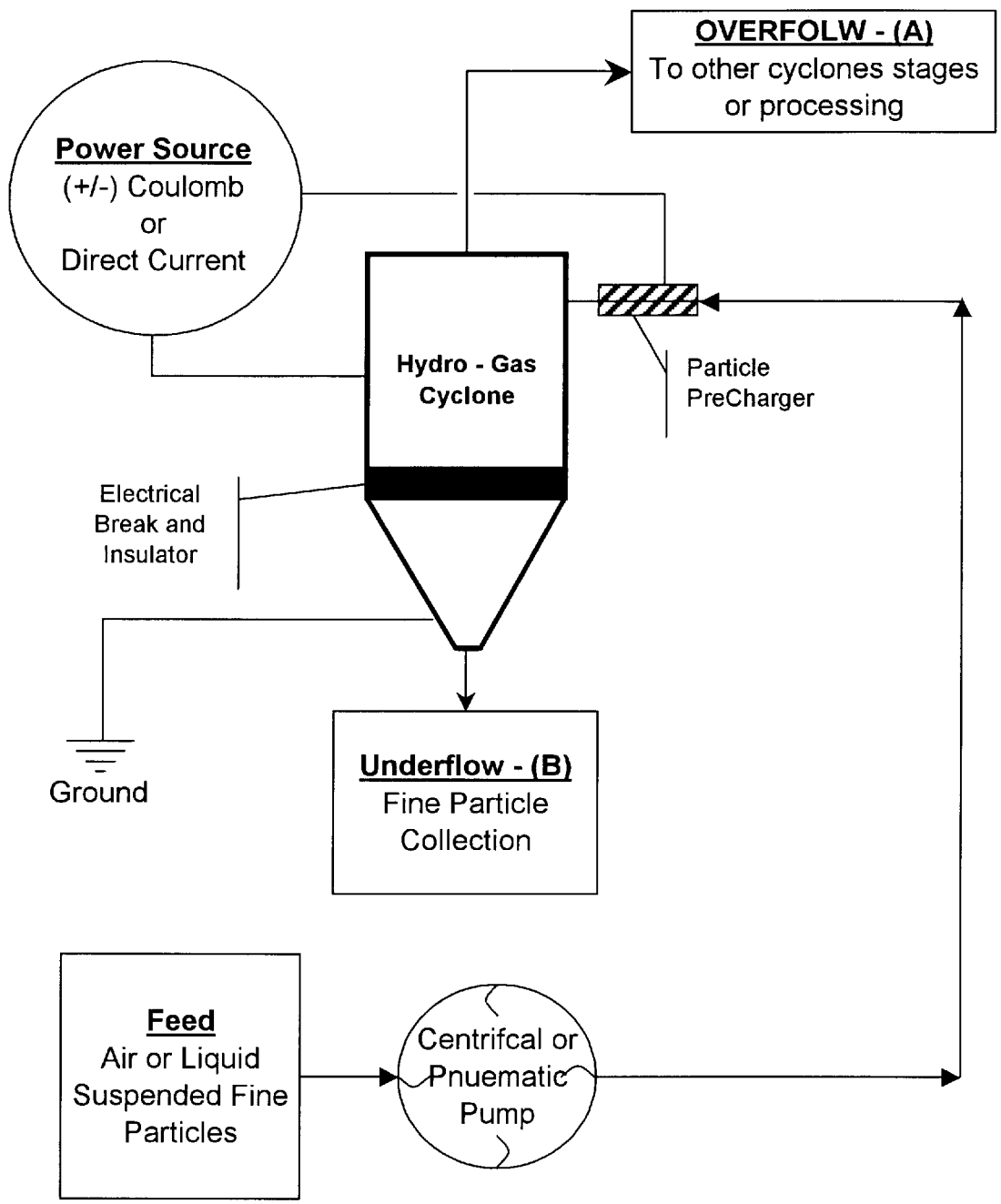

FIG. No. 3 is a diagram showing successfully separated particle sizes from water at room temperature using a prior art hydrocyclone.

FIG. No. 4 is a schematic diagram of a cyclone of the present invention using coulomb forces to assist the separation of particles from gases in the gas cyclone.

FIG. No. 5 is a schematic diagram of a cyclone of the present invention using electrical current to assist the separation of particles from gases in a gas cyclone.

FIG. No. 6 is a schematic diagram of a hydrocyclone of the present invention using coulomb forces to assist in the separation of particles from liquids in the hydrocyclone.

FIG. No. 7 is a schematic diagram of a hydrocyclone of the present invention using electrical current to assist in separating particles from liquids in a hydrocyclone.

FIG. No. 8 is a schematic diagram of a cyclone of the present invention using magnetic forces to assist in the separation of particles from gases in a gas cyclone.

FIG. No. 9 is a schematic diagram of a cyclone of the present invention using electromagnetic forces to assist in the separation of particles from liquids in a hydrocyclone.

FIG. No. 10 is a schematic diagram of a cyclone of the present invention having a precharger.

FIG. No. 11 is a schematic diagram of a cyclone of the present invention having an alternative precharger.

FIG. Nos. 12, 13 and 14 shows three optional ways of charging particles and inducing a current in a cyclone or hydrocyclone of the present invention.

FIG. No. 15 shows the precharger attached directly to the top of the cyclone for the separation of particles from gases.

FIG. No. 16 shows an alternative embodiment of a cyclone having sequential electromagnets combined with a mechanical vibrator.

FIG. No. 17 shows an alternative embodiment of a cyclone having a mechanical vibrator and a sonic or ultrasonic wave generator.

DETAILED DESCRIPTION OF THE INVENTION

The present invention relates to the application of electrical and magnetic forces combined with vibrations to hydrocyclones or cyclones to assist the centrifugal forces in making more efficient separations. Where centrifugal forces or electrical forces or magnetic forces alone do not perform adequately, the combined forces can provide much improved separation.

Various aspects of hydrocyclones are discussed in detail by reference books such as "Hydrocyclones" by L. Svarovsky, Techomic Publishing Co. Inc. Discussions on the types and uses of gas cyclones are in books such as "Chemical Engineers' Handbook" by Robert H. Perry and Cecil H. Chilton, Fifth Edition, Chapter 20, page 56 to Chapter 21, page 57, McGraw Hill. The contents of these references are part of the common general knowledge of a person skilled in the art.

FIG. No. 1 is a diagram of a typical prior art hydrocyclone used to separate particles from liquids. This typical hydrocyclone may be used to produce the separations the results of which are presented in FIG. No. 3. FIG. No. 2 is a diagram of a typical prior art cyclone used to separate solid particles from gases. FIG. No. 3 shows successfully separated particle sizes from water at room temperature using a prior art hydrocyclone. The variables shown are the particle size removed, the pressure drop across the hydrocyclone at a given flow rate and the size of hydrocyclone.

FIG. No. 4 is a schematic diagram showing the configuration of one embodiment of a cyclone arrangement to make coulomb forces work with the centrifugal forces of the cyclone to separate particles from gases in the gas cyclone. The bottom portion of the cyclone is electrically insulated from the top portion of the cyclone by an insulating band. The top portion of the cyclone is used to add a negative charge to the particles so they are pulled to the walls of the bottom portion of the cyclone by a positive charge. The particle charges could be reversed which would necessitate the charges on the cyclone being reversed. The coulomb attraction assists the centrifugal forces in moving the particles to the wall of the lower portion of the cyclone. The placing of the electrical insulator depends on the cyclone being modified. Vibrations are induced into the gas by sonic wave generator and onto the walls of the cyclone by mechanical means. The vibrations assist the movement of the particles to the wall and out of the cyclone in the under-flow.

Appropriate sonic wave generators and physical vibration generators are well known in the art. In one embodiment, a "white noise" sound generator is implemented to produce sonic vibrations over a wide frequency range through the fluid. In one embodiment the physical vibration generator is a mechanism which uses reciprocating-mass or a rotating eccentric mass to generate the desired vibration. The vibration generator is attached to the cyclone wall, preferably to the lower portion, to induce vibrations in the cyclone. Suitable physical vibration generators may include electromagnetic vibration generators or mechanical vibrators such as those disclosed in U.S. Pat. No. 3,945,613, the contents of which are incorporated herein by reference, or the like. The cyclone wall may also be physically vibrated using sonic waves.

In one embodiment, a physical vibrator is used to vibrate the cyclone wall while a separate sonic wave generator is used to transmit sonic waves through the fluid.

FIG. No. 5 is a schematic diagram showing how the flow of electrical current can be combined with centrifugal forces to assist in separating particles from gases in a gas cyclone. Again, the bottom portion of the cyclone is electrically insulated from the top part of the cyclone. The negative charged particles carry current from the top portion of the cyclone to the lower portion and are attracted to the positively charged lower portion which assists the centrifugal forces of the cyclone. Vibrations induced by sound into the gas and physically in the walls assist in the movement of the particles.

FIGS. No. 4 and No. 5 demonstrate one way in which a negative charge can be added to particles in a cyclone. Once the charge is added to the particles at the entrance or top of the cyclone they are spun in a no charge zone and then attracted to the lower section of the gas cyclone or hydrocyclone by the opposite charge. The particles are pulled over because they are off center and are attracted to the walls because of being off center. Hence the cyclone gets the particles off center with centrifugal forces so that the electrical charge on the walls of the cyclone will assist the cyclone centrifugal forces in separating the particles from the gas or liquid. Because coulomb charges or magnetism vary approximately as the square of the distance, once the particles are off center the assistance from the charge or magnetism is effective and gets much more effective the closer the particles get to the wall. Almost all gaseous cyclones and liquid hydrocyclones have no particles at their centers; as a result, the electrical forces are quite effective in assisting the centrifugal forces within the gaseous cyclones or liquid hydrocyclones and become most effective at or near the walls.

FIG. No. 6 is a schematic diagram showing the essentials of the arrangement to make coulomb forces work with the centrifugal forces of the hydrocyclone to separate particles from liquids in the hydrocyclone. The bottom portion of the hydrocyclone is electrically insulated from the top portion of the hydrocyclone. The top of the hydrocyclone is used to add a negative charge to the particles so they are pulled to the walls of the bottom portion of the hydrocyclone by a positive charge. The particle charges could be reversed along with the hydrocyclone charges. The coulomb attraction assists the centrifugal forces in moving the particles to the wall of the lower portion of the hydrocyclone. The placement of the electrical insulator depends on the hydrocyclone being modified. Sonic vibrations are induced into the liquid and physical vibrations are induced in the walls of the hydrocyclone to assist in the movement of the particles through the liquid and out of the hydrocyclone with the under-flow material.

FIG. No. 7 is a schematic diagram showing how the flow of electrical current can be combined with centrifugal forces to assist in separating particles from liquids in a hydrocyclone. The bottom portion of the hydrocyclone is electrically insulated from the top part of the hydrocyclone. The negative charged particles carrying current from the top portion of the hydrocyclone to the lower portion assists the centrifugal forces of the hydrocyclone. Vibrations are induced into the hydrocyclone using sound in the liquid and physical vibrations on the wall to assist the movement of the particles through the liquid and out of the hydrocyclone with the under-flow.

FIG. No. 8 is a schematic diagram showing how magnetic forces can be combined with centrifugal forces to separate particles from gases in a gas cyclone. In this case the top of the cyclone does not have to be electrically insulated from the bottom part of the cyclone. Magnets are placed about the walls of the cyclone. The cyclone should preferably be made of a non-magnetizing material so the magnets can be adjusted. The magnets should be adjusted so they assist in pulling the material to the cyclone walls but do not hold it permanently but let it slide out with the under-flow at the bottom of the hydrocyclone. Vibrations using sound in the liquid and physical vibrations on the wall assist the particles in moving through the liquid and out of the hydrocyclone with the under-flow.

FIG. No. 9 is a schematic diagram showing how electromagnetic forces can be combined with centrifugal forces to separate particles from liquids in a hydrocyclone. In this case the top of the hydrocyclone does not have to be electrically insulated from the bottom part of the cyclone. In this case there should be electromagnets about the walls of the hydrocyclone. The hydrocyclone should preferably be made of a non magnetizing material so the electromagnets can be adjusted. The electromagnets should be adjusted so they assist in pulling the material to the hydrocyclone walls but do not hold it permanently but let it slide out with the underflow. Vibrations using sound in the liquid and mechanical vibrations on the wall assist the particles in moving through the liquid and out of the hydrocyclone with the under-flow.

FIG. No. 10 shows one way of charging particles at the entrance to a cyclone or hydrocyclone so the particles can be more easily attracted to the lower cone of the cyclone or hydrocyclone. The cyclone is connected with the precharger that charges particles before they enter the cyclone or hydrocyclone. The precharger is electrically insulated from the cyclone or hydrocyclone. Vibrations are used to assist the movement of the particles as in the other embodiments described above.

FIG. No. 11 shows another way of assisting in charging particles at the entrance to a cyclone or hydrocyclone so they can be more easily attracted to the lower cone of the cyclone or hydrocyclone. The top of the cyclone or hydrocyclone is totally connected electrically with the precharger that assists in charging particles. The lower section of the cyclone is electrically insulated from the top of the cyclone or hydrocyclone and the precharger. Again, the particles charged at the top are pulled to the lower walls by centrifugal and electrical forces. Again, vibrations are used to assist in the particle movement.

FIG. No. 12 shows one example of charging particles and inducing a current in a cyclone or hydrocyclone. In this embodiment, an exposed corona discharge wire is provided in the inlet which charges the particles as they pass through the corona discharge of the wire. In FIG. No. 13, the vortex finder itself is charged. In FIG. No. 14, an exposed corona wire is provided along the vertical longitudinal axis of the cyclone. Again in each example shown, mechanical and/or sonic vibrations will assist the movement and separation of the particles.

FIG. No. 15 shows the precharger attached directly to the top of the cyclone for the separation of particles from gases. The top portion of the cyclone is also charged in this embodiment as well as the precharger.

The inventors tested the above proposition and it tested positive in field tests both with gaseous cyclones and liquid hydrocyclones. With gaseous cyclones, the use of a precharger is preferred. The precharger can be manufactured in many ways such as thin plates, a metal grid system or if it is safe and there is no danger of explosion one could have various plasma arcs putting charges on the particles. If a precharger is used on the particles one may make the complete cyclone of the opposite charge rather than a portion of the cyclone. The present invention encompasses both approaches. Also assisting the effectiveness of electrical forces in cyclones is the fact that many particles fed to the cyclone are naturally charged such as clay particles which are negatively charged in nature. Particles other than clay may have either positive or negative charge and that could be taken advantage of in designs of the present invention. In all cases it was found that mechanical vibration assisted in the movement of particles. The vibrations should not be violent but should be moderate so as to help movement along the walls and out the under-flow. Sound vibration was also of assistance in movement through the fluids and may play a role in agglomerating the charged particles. A combination of sonic vibration of the fluid and mechanical vibration of the cyclone wall was particularly effective.

Numerous tests were run with the new design of cyclone. The results showed improved separation by having an increase in solids in the underflow when all other variables were kept constant except that the electrical charge was turned on to attract the particles to the lower portion of the cyclone or hydrocyclone and vibrations were induced. This confirmed that coulomb and current flows assist the centrifugal forces in a cyclone or hydrocyclone and are even more effective with vibration.

Figure 16:
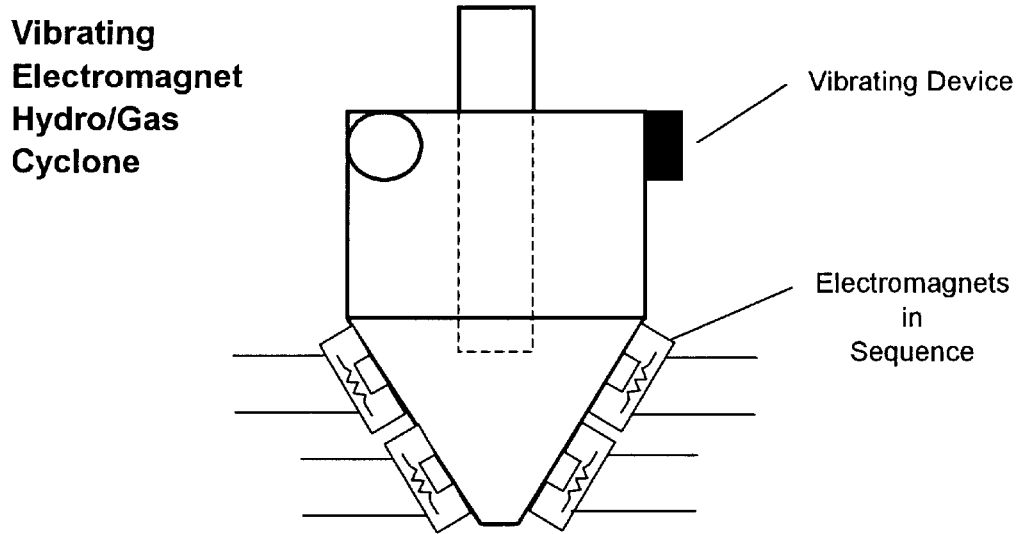
Figure 17:
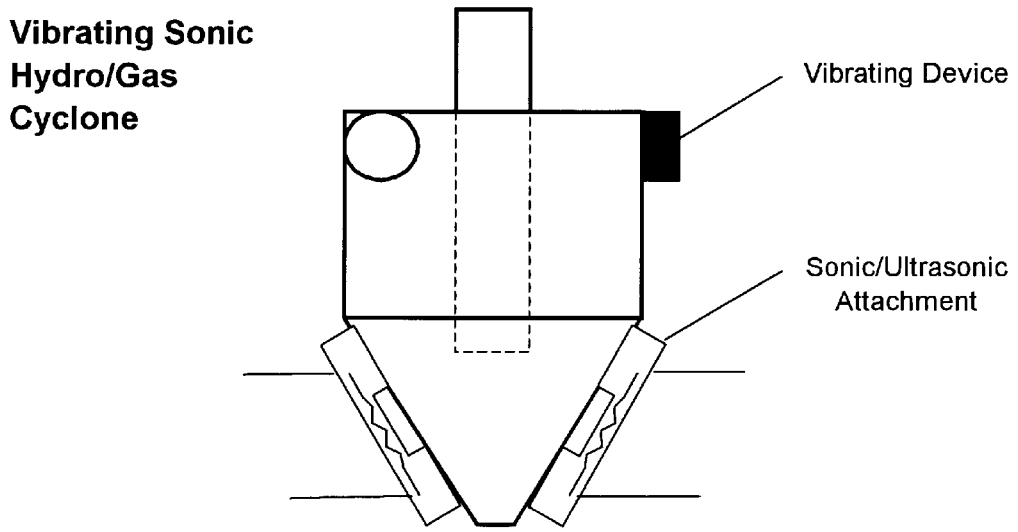

Tests were done with a plastic cyclone and hydrocyclone made of clear plastic with magnets placed about them to show that magnetism can be used effectively to assist cyclones in separation if the underflow product is attracted by magnetism. In these tests it was also clear that the magnetic forces would have to be set up properly because if too strong a magnetic force is used, the product will not leave with the underflow but will merely cling to the wall. The vibrations also play a key role in the correct balance and removing the product off of the wall. In FIG. 16, an alternative embodiment is illustrated showing the use of sequential electromagnets. In operation, the top set of electromagnets is turned on, attracting solids to the periphery. Then, the top set is turned off and the bottom set turned on. In the meantime, the cyclone is being vibrated to assist with the movement of particles outwardly and downwardly.

Tests were done with the gaseous cyclones and liquid hydrocyclones using coulomb and electric current systems and improvements in separation occurred over a range of particle sizes. In some embodiments, the top portion of the cyclone must be electrically separate and insulated from the bottom portion so that the system that charges the particles is separated from the part that pulls the particles against the walls of the cyclone or hydrocyclone. In embodiments where a precharger is provided, it may not be necessary to provide an insulating break to electrically separate the top and bottom portions of the cyclone; the complete cyclone may be used to attract the particles to the walls. The decision on how to arrange the charges on the cyclone or hydrocyclone depends on the fluid, the particles, and various concerns such as safety that will occur in the field. A person skilled in the art will be able to assess these variables and arrange the charges appropriately.

From the tests done, it is clear that electrically assisted or magnetically assisted liquid hydrocyclones or gaseous cyclones may out perform conventional cyclones that do not use the combined forces. Clearly coulomb attraction, current conduction, or magnetic forces can be combined with centrifugal forces in a cyclone or hydrocyclone of any design to increase its effectiveness. There is no design of cyclone or hydrocyclone that cannot be improved with the use of coulomb attraction, current flow, or magnetism on particles effected by those forces especially in combination with sonic, ultrasonic and/or mechanic vibrations enhance the separation process.

It will be understood by those skilled in the art that modification, variations and adaptations of the specific embodiments described above may be made without departing from the scope of the invention claimed herein.

What is claimed is:

1. A separator for separating solid particles from a liquid or gaseous fluid comprising:
    a) a conical separator housing having an inlet disposed near the top of the housing and a discharge formed in the bottom of the housing;
    b) a vortex column centrally disposed within the housing, said column having an bottom intake opening within the housing and a top outlet opening outside the housing;
    c) vibrating means associated with the housing for inducing vibrations in the housing and within the housing wherein said vibrating means comprises either or both of a physical vibration inducing means or a sonic wave generator;
    d) separation enhancing means associated with the housing, wherein said separation enhancing means comprises first and second electromagnets wherein the first electromagnet is situated above the second and they may be activated sequentially.

2. A separator for separating solid particles from a liquid or gaseous fluid comprising:
    a) a conical separator housing having an inlet disposed near the top of the housing and a discharge formed in the bottom of the housing, said housing having a top portion and a bottom portion separated by an electrical insulator;
    b) a vortex column centrally disposed within the housing, said column having an bottom intake opening within the housing and a top outlet opening outside the housing;
    c) vibrating means associated with the housing for inducing vibrations in the housing and within the housing wherein said vibrating means comprises either or both of a physical vibration inducing means or a sonic wave generator;
    d) separation enhancing means associated with the housing, wherein said separation enhancing means comprises an electrostatic charge generator connected to the top portion or the bottom portion of the housing and the other portion of the housing is grounded.

3. A separator for separating solid particles from a liquid or gaseous fluid comprising:
    a) a conical separator housing having an inlet disposed near the top of the housing and a discharge formed in the bottom of the housing, said housing having a top portion and a bottom portion separated by an electrical insulator;
    b) a vortex column centrally disposed within the housing, said column having an bottom intake opening within the housing and a top outlet opening outside the housing;
    c) vibrating means associated with the housing for inducing vibrations in the housing and within the housing wherein said vibrating means comprises either or both of a physical vibration inducing means or a sonic wave generator;
    d) separation enhancing means comprising a direct current power source connected to one of the top portion or the bottom portion of the housing as an anode and the top portion or bottom portion of the housing as a cathode.

4. The separator of claim 1, 2 or 3 further comprising an electrical precharger associated with the housing inlet for charging the fine particles with an electric charge prior to entering the housing.

5. The separator of claim 4 wherein the precharger is electrically connected to a top portion of the housing which is electrically separated from a bottom portion of the housing by an electrical insulator.

6. The separator of claim 4 wherein the precharger is electrically separated from the housing by an electrical insulator.

7. A method of separating particles from a gas or liquid comprising the steps of:
    (a) providing a cyclonic separator having an upper portion and a lower portion which are separated by an electrical insulator;
    (b) charging the particles within the upper portion, such that the particles are electrically attracted to the wall of the lower portion; and
    (c) vibrating the lower portion wall.

8. The method of claim 7 further comprising the step of transmitting sonic vibrations through the gas or liquid.

* * * * *